(No Model.)
J. W. HILTON.
MEANS FOR PROTECTING SMALL TREES, PLANTS, FLOWERS, &c.
No. 593,579. Patented Nov. 16, 1897.
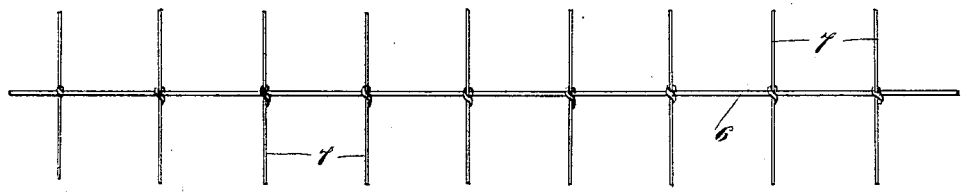
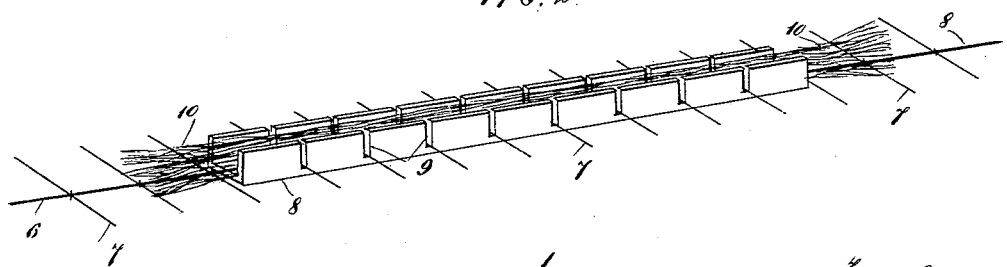
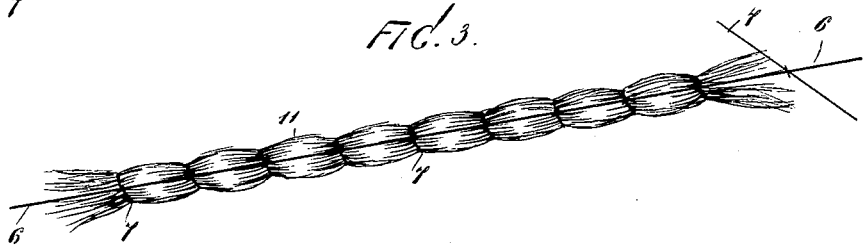
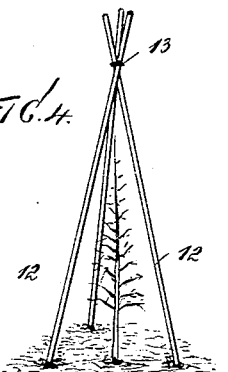
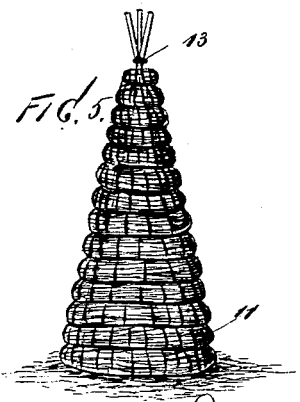
WITNESSES
INVENTOR
James W Hilton
BY
Edgar Tate & Co
ATTORNEYS

United States Patent Office.

JAMES W. HILTON, OF BROOKLYN, NEW YORK.

MEANS FOR PROTECTING SMALL TREES, PLANTS, FLOWERS, &c.

SPECIFICATION forming part of Letters Patent No. 593,579, dated November 16, 1897.

Application filed November 16, 1896. Serial No. 612,233. (No model.)

*To all whom it may concern:*

Be it known that I, JAMES W. HILTON, a citizen of the United States, residing at Brooklyn, in the county of Kings and State of New York, have invented certain new and useful Improvements in Means for Protecting Small Trees, Plants, Flowers, &c., of which the following is a full and complete specification, such as will enable those skilled in the art to which it appertains to make and use the same.

This invention relates to means for protecting small trees, plants, flowers, and shrubs; and it consists in providing a cord or string of any desired length, which is provided with a plurality of short cross strings or cords which are tied thereto and by means of which a rope of straw or similar material may be formed, said rope of straw being adapted to be wound around the tree, plant, shrub, or other articles to be protected or around a frame inclosing the same.

The invention is fully disclosed in the following specification, of which the accompanying drawings form a part, in which—

Figure 1 is a view of a cord or string provided with a plurality of cross cords or strings which are secured thereto; Fig. 2, a perspective view showing the method of forming a rope of straw or other material; Fig. 3, a similar view of a rope of straw so formed; Fig. 4, a perspective view showing a frame inclosing a small shrub, and Fig. 5 a similar view showing the method of inclosing said frame and shrub according to my invention.

In the drawings forming part of this specification the separate parts of my improvement are designated by the same numerals of reference throughout the several views, and in the practice of my invention I provide a string or cord 6, to which is secured at regular intervals any desired number of short cross strings or cords 7, and the longitudinal cord or string 6 may be of any desired length. I also provide a rectangular oblong box 8, which may be of any desired length and which is provided at intervals corresponding with the spaces between the cross strings or cords 7 with transverse notches in its opposite sides, as shown at 9, and the top of said box is open, and in practice the cord or string 6 is passed longitudinally therethrough and the transverse strings or cords 7 are passed through the notches or recesses 9 in the sides of the box or case. The box or case is then filled with straw or similar material, as shown at 10, and the said transverse strings or cords 7 are wrapped around the same and tied, thus forming a rope 11, as shown in Fig. 3. It will be understood that this rope of straw or other material may be made as long as desired and is also perfectly flexible, and said rope may be wrapped around a small tree, shrub, or other plant, so as to protect the same from frost and also from rabbits and other small animals. In practice, however, I prefer to provide a frame by which the shrub or plant is inclosed, and this frame, as shown in Fig. 4, may consist of three or more upright standards or rods 12, the lower ends of which are secured in the ground around the shrub or plant and the upper ends of which are tied together, as shown at 13, and when this device is used the rope 11 is wound around the same, as shown in Fig. 5, and thus an absolute and perfect protection for the shrub or plant is provided.

My improvement is well adapted to accomplish the result for which it is intended and is also comparatively inexpensive.

Having fully described my invention, I claim as new and desire to secure by Letters Patent—

1. The herein-described means for protecting small trees, comprising a tripod placed over the tree, and a rope of straw composed of a longitudinal cord or string, a plurality of short transverse cords or strings secured thereto and a body portion of straw which is tied to the longitudinal cord or string by said transverse cords or strings, said rope being wrapped around said tripod in continuous coils from the base to the apex thereof and completely inclosing said tree, all substantially as shown and for the purpose set forth.

2. The herein-described means for forming a rope of straw or similar material for the protection of small trees, shrubs, and plants, consisting of an oblong box or case open at the top, and provided with transverse notches or recesses in its opposite sides, and a longitudinal string or cord to which is secured a plurality of transverse strings or cords, substantially as shown and described.

In testimony that I claim the foregoing as my invention I have signed my name, in presence of the subscribing witnesses, this 14th day of November, 1896.

JAMES W. HILTON.

Witnesses:
CHARLES S. ROGERS,
A. L. PICKARD.